(12) United States Patent
Bhaumick (10) Patent No.: US 7,496,370 B2
(45) Date of Patent: Feb. 24, 2009

(54) SYSTEM AND METHOD FOR LOCATION UPDATE IN MOBILE RADIO NETWORKS

(75) Inventor: Asesh Bhaumick, Ostermundigen (CH)

(73) Assignee: Swisscom Mobile AG, Bern (CH)

( * ) Notice: Subject to any disclaimer, the term of this patent is extended or adjusted under 35 U.S.C. 154(b) by 780 days.

(21) Appl. No.: 10/486,204

(22) PCT Filed: Jun. 19, 2002

(86) PCT No.: PCT/CH02/00334

§ 371 (c)(1),
(2), (4) Date: Feb. 13, 2004

(87) PCT Pub. No.: WO03/017708

PCT Pub. Date: Feb. 27, 2003

(65) Prior Publication Data

US 2004/0248546 A1    Dec. 9, 2004

(30) Foreign Application Priority Data

Aug. 16, 2001   (EP)  .................................. 01810791

(51) Int. Cl.
*H04Q 7/20*   (2006.01)
(52) U.S. Cl. ................. 455/456.5; 455/456.3; 455/433; 455/466
(58) Field of Classification Search .............. 455/432.1, 455/456.3, 456.5, 456.6, 433, 466
See application file for complete search history.

(56) References Cited

U.S. PATENT DOCUMENTS 5,966,663 A * 10/1999 Gleason ...................... 455/466

6,370,390 B1 * 4/2002 Salin et al. ................... 455/466

(Continued)

FOREIGN PATENT DOCUMENTS

WO          9736437          10/1997

(Continued)

OTHER PUBLICATIONS

European Telecommunications Standards Institute (ETSI): "Unstructured Supplementary Service Data (USSD) Stage 3" European Telecommunication Standard, XX, XX, vol. 4.0.0, No. GSM 490, Oct. 15, 1993, page Complete13 XP002104039 the whole document.

*Primary Examiner*—Fan Tsang
*Assistant Examiner*—Lisa Hashem
(74) *Attorney, Agent, or Firm*—Oblon, Spivak, McClelland, Maier & Neustadt, P.C.

(57) ABSTRACT

A method for location-based services over a mobile radio network. The method includes sending, to a mobile apparatus, at least one or more data messages generated according to a telecommunication standard. The method includes generating, by the mobile radio apparatus, an error report upon (i) reception of the at least one or more generated data messages and (ii) a determination from the at least one or more data messages that, according to the telecommunications standard, the error report has to be produced. The method further includes sending the error report, generated based upon the telecommunication standard of the received data messages, to at least a base station and/or a node of a cell in which the mobile radio apparatus is currently located or attached. The method also includes updating and storing the location information of the mobile radio apparatus.

23 Claims, 5 Drawing Sheets

U.S. PATENT DOCUMENTS

| | | | |
|---|---|---|---|
| 6,381,456 B1 * | 4/2002 | Ko | 455/435.1 |
| 6,424,841 B1 * | 7/2002 | Gustafsson | 455/466 |
| 6,650,896 B1 * | 11/2003 | Haymes et al. | 455/423 |
| 6,845,241 B2 * | 1/2005 | Edlund et al. | 455/456.1 |
| 6,898,432 B1 * | 5/2005 | Jiang | 455/456.1 |
| 7,116,985 B2 * | 10/2006 | Wilson et al. | 455/456.1 |
| 7,277,711 B2 * | 10/2007 | Nyu | 455/456.1 |
| 2003/0096621 A1 * | 5/2003 | Jana et al. | 455/456 |
| 2004/0198385 A1 * | 10/2004 | Wheeler et al. | 455/456.1 |
| 2004/0198395 A1 * | 10/2004 | Kimoto et al. | 455/456.1 |
| 2004/0229632 A1 * | 11/2004 | Flynn et al. | 455/456.3 |
| 2007/0149214 A1 * | 6/2007 | Walsh et al. | 455/456.1 |
| 2007/0155400 A1 * | 7/2007 | Madsen | 455/456.1 |
| 2008/0004043 A1 * | 1/2008 | Wilson et al. | 455/456.3 |

FOREIGN PATENT DOCUMENTS

| | | |
|---|---|---|
| WO | 9826615 | 6/1998 |
| WO | 9834423 | 8/1998 |

* cited by examiner

SYSTEM AND METHOD FOR LOCATION UPDATE IN MOBILE RADIO NETWORKS

The present invention relates to a method and system for location update in mobile radio networks, wherein, for updating location information of a mobile radio apparatus in a GSM mobile radio network, which mobile radio network comprises a Mobile-Services Switching Centre (MSC) and one or more Base Station Controllers (BSC), each having one or more base stations (BTS), and which mobile radio network is connected via the MSC to the public, switched telephone network, the location of the mobile radio apparatus is determined based upon the individual cells of base stations (BTS: Base Transceiver Station) of the mobile radio network. The invention relates particularly to methods and systems in which the location information is updated and stored in a Home Location Register (HLR) module of the mobile radio network, and by means of which Location-Based Services are offered over the mobile radio network. Further it relates particularly to GSM and/or GPRS and/or UMTS mobile radio networks.

Public mobile radio networks (PLMN: Public Land Mobile Network) allow the users to access various mobile telecommunications services. Such a mobile radio network may be regarded as an expansion of the public switched telephone network (PSTN). It is typically composed (as described, for example, in Digital cellular telecommunications system; Network architecture: GSM [Global System for Mobile Communications]; Technical Specification; European Telecommunications Standards Institute (ETSI), TS/SMG-030302Q) of various transmission and reception areas which are assigned to a so-called Mobile-Services Switching Center (MSC), the areas having a destination code and a common routing plan. An MSC forms the functional interface between the switched network and the mobile radio network. The MSCs make all necessary functions available for calls from or to a mobile radio apparatus. In order to obtain blanket coverage of the receiving and transmitting region in a certain geographical territory, several Base Station Systems (BSS) are normally necessary; i.e., each mobile-services switching center is consequently an interface to several base station systems. Conversely, several MSCs are normally necessary to cover a whole country. A BSS consists of a Base Station Controller (BSC) and one or more base stations (BTS: Base Transceiver Station). A base station covers a so-called receiving-transmitting cell. The base station system comprises all technically necessary means (transceivers, controllers, etc.), so that the MSC can communicate with a certain mobile radio apparatus in a certain cell. A BSC is a network component of the mobile radio network in order to respond to one or more base stations.

Mobile telecommunication over such public mobile radio networks as described above has been able to achieve considerable growth in all sectors in recent years through a broad range of new and improved offers both in the technological area and in the services offered. One of the factors which has contributed to such growth is that the user of such a mobile radio network can always be reached everywhere and can be provided with information. Besides the time, the location of the user at the moment plays a major part in the demand for services and a sensible offer of services. Thus, for example, there is not much sense in informing a mobile radio network user who is presently on the Champs Elysées in Paris about the current business hours of a local pizza service in the Irish town of Westport. Therefore, potential providers of services are attaching increasingly great importance to so-called location-based services. It is desired to provide the mobile radio subscriber with information, advertising, and services which are as up-to-date and suitable as possible. The more exactly the momentary position of the user is known, the easier it is to provide him with location-based services specifically adapted to his needs, without loading the mobile radio network with unnecessary data traffic.

In GSM mobile radio networks, an MSC or several MSCs jointly have a respective home location register (HLR) comprising information on all those network subscribers who belong to the geographical area covered by the mobile-services switching center. Stored in the HLR database is a data record for every user situated in the geographical area of the MSC. Each of these records comprises various types of information regarding the allocated user, such as billing information, services available to the respective user, etc. Furthermore, the record comprises location information (visited exchange) which indicates the mobile-services switching center (MSC), etc., to which the user is assigned at the moment. This information is needed, among other things, to route incoming calls to the respective MSC in whose territory the user is situated at the moment. On the other hand, this information concerning the geographical location of a user may also be used specifically in order to offer location-based services, such as location-dependent advertising, information, ordering systems, etc.

One of the problems with the HLR is that the location information does not comprise the most up-to-date location data but only those for the location where the user was last active over the mobile radio network. Although the mobile radio apparatus automatically logs into a new network when the user leaves the blanket coverage of the one last current, e.g. upon crossing national borders, etc., if the mobile radio apparatus is inactive at the time when the user changes the transmitting cell of a base station within the same network, the mobile radio apparatus does not give the mobile radio network any acknowledgment concerning its new location. Thus, the location data in the HRL are not updated until the next incoming or outgoing telephone call. If the network wishes to update the momentary location of a user, e.g. by sending an SMS (Short Message Service) message, this cannot be done without the user's having to take notice of it is some way (e.g. through the alert that an SMS message has arrived). However, this is not always desirable, e.g. when the user does not want to be disturbed continually by such alerts, etc. Another disadvantage of the present type of updating of the HLR is described in U.S. Pat. No. 5,561,854, for example. Likewise to be cited as prior art is International Patent Application No. WO 98/26615 of Telefonaktiebolaget LM Ericsson. WO 98/26615 shows a method by means of which the location data in the HRL can be updated, i.e., a location-update can be carried out at regular intervals without the user's being aware of it. In the method, the updating of the location is carried out via a USSD, SMS, or MMS dialog initiated either by the MSC (Mobile Services Switching Center), the VLR (Visitor Location Register), or the HLR (Home Location Register) by means of a USSD, SMS, or MMS request or some other notification. The mobile radio apparatus replies to this with a USSD, SMS, or MMS message, its current location being transmitted. In order t be able to decode the USSD, SMS, or MMS message, however, the mobile radio apparatus must have a suitable software or hardware module. If the mobile radio apparatus registers a change of location, e.g., a change of cell, the mentioned software or hardware module of the mobile radio apparatus reports this either automatically or upon inquiry by the HLR with a USSD, SMS, or MMS message, e.g., to the HLR. The method of WO 98/26615 has the drawback that a special module or interface to carry out the USSD, SMS, or MMS transactions is needed in every mobile station. Furthermore, the method requires an additional database entry, both at the VLR of the VPLMN (Visited Public Land Mobile Network) of the current MSC (Mobile Station Switching Center), for example, and at the HLR of the HPLMN (Home Public Land Mobile Network), where the momentary location of the mobile radio apparatus can be stored for the location-based services. One of the drawbacks of the method of WO 98/26615 is that not only the software and/or hardware of the mobile radio apparatus, but also, for example, the software and/or hardware of the HLR must be modified. Besides the considerable time and expense required for this purpose, a resulting drawback is that such modifications can usually not be undertaken so readily since the mentioned software and/or hardware components are usually proprietary modules, possibly even covered by protective rights. The International Patent Application No. WO 98/34423 A of Motorola Inc. discloses a further method and system for retrieving and storing the location of a Mobile Station (MS), i.e. the cell identifier of the serving cell, where paging is performed within a location area, and the cell identifier can be retrieved from the paging response send by the MS. The location is determined by sending a first page to the MS over a paging channel. From the response of the Mobile Station the serving and neighbour Base Stations of the MS are determined. With a second page message the MS is instructed to periodically transmit a predefined location message, so that the location of the Mobile Station can be achieved and updated.

It is an object of the Invention to provide a novel method and system for updating location information of a mobile radio apparatus in a mobile radio network which does not exhibit the above-described drawbacks. In, particular, it should be possible to carry out the updating without the user's needing to and/or being able to take notice of it and without modifications to the mobile radio apparatus being necessary.

According to the present invention, this object is achieved particularly though the elements of the independent claims. Moreover, further: advantageous embodiments follow from the dependent claims and the specification.

In particular, these objects are achieved by the invention in that for location update in a mobile radio network, for updating location information of a mobile radio apparatus in the mobile radio network, the location of the mobile radio apparatus is determined based on the individual cells of base stations (BTS) of the mobile radio network, at least one network initiated data message being generated which, according to the telecommunication standard, produce an error report upon reception by the mobile radio apparatus, and at least one of the data messages thus generated is sent to the mobile radio apparatus, the mobile radio apparatus sending an error report based upon the data message received to at least the base station and/or node of the cell in which the mobile radio apparatus is situated or attached at the time, and the location information of the mobile radio apparatus being updated and stored by means of that base station which received the error report from the mobile radio apparatus. The mobile radio network may be a GSM (Global System for Mobile communications) and/or GPRS (Generalized Packet Radio Service) and/or UMTS (Universal Mobile Telephone System). But any other standards, as e.g. American or Japanese mobile communication network standards etc., are also conceivable. The data messages may be USSD (Unstructured Supplementary Service Data), SMS (Short Message Service), and/or MMS (Multimedia Messaging Service) messages. However, it can also be applied to other standards as e.g. IS 136 or IS 95 of the American mobile communication standard or I-mode of the Japanese standard. For generating the at least one data message which according to telecommunication standard produces an error report upon reception by the mobile radio apparatus, the data-coding scheme of the data message may, for example, be set to false values. Another possibility is that the mobile radio apparatus sends the error report to the base station based upon non-executable data operations, as e.g. USSD, SMS, or MMS data operations. Other modifications of the foregoing are likewise conceivable. One advantage of the invention is that the entry of location information in a central database can be updated without the user of a mobile radio apparatus having to take notice thereof, e.g. in the form of an alert report or an SMS message, etc. The central database may typically be a home location register (HLR) and/or a visitor location register (VLR) of a GSM mobile radio network based upon the GSM standard. This embodiment then has the same advantages as just mentioned. The updating of location information in the HLR and/or VLR register module according to the invention may also be used, as an independent solution or in combination with solutions such as are described in U.S. Pat. No. 5,561,854, for problems such as a crash of the HLR and/or VLR. A further advantage is that another channel is used for the data messages (e.g. USSD, SMS, or MMS messages) than for calls, so that calls are not interrupted upon the location update. It is likewise an advantage that the method requires no modification of the existing hardware or software in the mobile radio apparatus (MS: Mobile Stations) or in the VLR or HLR. Among other things, therefore, neither are there any infringements, etc., of protective rights existing on these parts, etc., or other problems in the use of proprietary components. In particular, it is even unimportant in the method according to the invention whether e.g. USSD, SMS, or MMS messages are also actually supported by the mobile radio apparatus.

In one embodiment, the location information in the mobile radio network is updated periodically, e.g. according to the requirements of a location-based service at respective intervals or as definable in a update unit, by means of the data messages. This embodiment has the advantage, among others, that the system-specific uncertainty regarding the whereabouts of a user can be determined precisely as to time and can thereby also be delimited as to location. This can be important, e.g. for location-based services such as computer-assisted direction of a user over the mobile radio apparatus, etc.

In a further embodiment, a location-based service determines the interval for updating the location information of a mobile radio apparatus by means of the data messages. This embodiment has the advantage, among others, that the updating of the user's location can be adapted precisely to the momentary requirements of the location-based service. Thereby, in particular, loading of the network with unnecessary data traffic can also be minimized. For example, in the case of directions, the resolution of location for user guidance should normally be the greatest at the beginning and end of the service, whereas in the middle (e.g. when the user is on the motorway between Paris and Basel), a rougher resolution of location is quite sufficient.

In another embodiment, the interval for updating the location information of a mobile radio apparatus is adapted by means of the data messages based upon the momentary local speed of movement of the mobile radio apparatus. This embodiment has the advantage, among others, that a predefined refinement of location for service providers can be guaranteed by the HLR and/or VLR.

At this point, it should be noted that besides the method according to the invention, the present invention also relates to a system for carrying out this method. In addition, it should be stressed again that although using the terms of the GSM/GPRS/UMTS network for the functional units and modules, the invention is not restricted to the GSM and/or GPRS and/or UMTS standards, but can easily be applied to other network or telecommunication standard as the American mobile communication standards or the Japanese standards.

Embodiments of the present invention are described below with the aid of examples. The examples of the embodiments are illustrated by the following enclosed figures.

Figure 1:
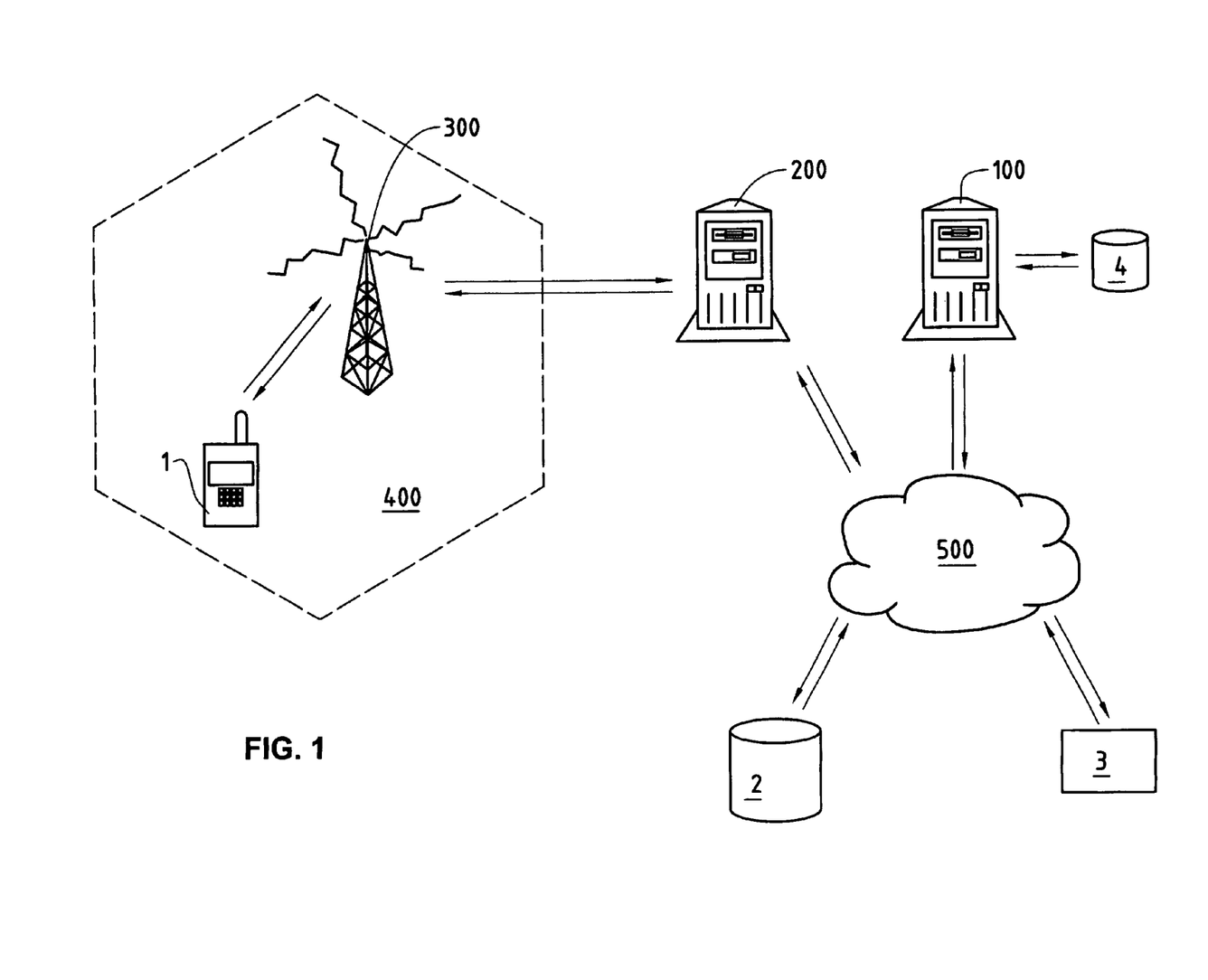
FIG. 1 shows a block diagram which illustrates schematically the architecture of an embodiment of a GSM mobile radio network with home location register 2 according to the invention, in which the location information of the mobile radio apparatus 1 is updated and stored in the HLR 2 by means of USSD, SMS, or MMS messages which, according to GSM standard, produce an error report upon reception by the mobile radio apparatus 1.

FIG. 1 illustrates an architecture which may be used for carrying out the invention. In this exemplary embodiment, a mobile radio network comprises at least one mobile-services switching center (MSC) 100 having a transmission-reception area allocated to the mobile-services switching center 100 and one or more base station controllers 200 each having one or more base stations (BTS: Base Transceiver Station) 300. The installation of the mobile radio network and its components may, for example, take place according to the GSM standard (Global System for Mobile Communications) of the ETSI (European Telecommunications Standards Institute) or to the GPRS (Generalized Packet Radio Service) standard or to the UMTS standard (Universal Mobile Telephone System). The mobile radio network may, for example, be a public mobile radio network (PLMN: Public Land Mobile Network), such as a GSM, GPRS, UMTS, or other mobile radio network, as e.g. a mobile radio network according to the American mobile communication standards and/or the Japanese standards. Communication over the mobile radio network takes place, for example, via protocols such as GPRS (Generalized Packet Radio Service), WAP (Wireless Application Protocol), or UMTS (Universal Mobile Telephone System). Via the MSC 100, the mobile radio network is connected, for example, to the public, switched telephone network (PSTN, Public Switched Telephone Network and/or ISDN, Integrated Services Digital Network). However, the mobile radio network may, for example, also be connected to a permanent circuit network, such as a LAN (Local Area Network) or WAN (Wide Area Network), to the Internet, a packet-oriented communication network, or some other communication network, particularly a mobile radio network. The mobile-services switching center 100 comprises switching and signaling functions for managing mobile radio apparatuses 1. The base station controllers 200 are connected to the mobile-services switching center 100 by means of a communication network and comprise checking and control functions for the base stations 300. Each of one or more of the base stations 300 is connected to a jointly allocated base station controller 200 comprising means for exchanging radio signals with mobile radio apparatuses 1 which are situated within the transmitting-receiving region covered by a base station 300, a so-called transmitter-receiver cell 400. One or more MSC 100 have a home location register (HLR) 2 comprising information concerning all those network subscribers, i.e. mobile radio apparatuses 1, which belong to the geographic area (which are presently situated there and are admitted as network subscribers) covered by the MSC 100. Stored in the HLR database 2 is a data record for each mobile radio apparatus 1 situated in the geographic area of the MSC 100. Each of these records comprises various types of information relating to the mobile radio apparatus 1 and the assigned user, such as billing information, services available to the respective user, etc. The record further comprises location information (visited exchange) indicating to which MSC 100, etc., the mobile radio apparatus 1 is momentarily allocated. This information is needed, among other things, for routing incoming calls to the respective MSC 100 in whose area the mobile radio apparatus 1 is situated at the moment. On the other hand, this information relating to the geographical location of a mobile radio apparatus 1 may also be used specifically for offering location-based services, such as location-dependent advertising, information, ordering systems, etc., for example. As usual, the mobile radio network may likewise comprise a backup system for the HLR module 2, by means of which, in case of a crash of the HLR, the information in the HLR 2 can be restored. The backup rhythm may typically be from a few minutes up to 24 hours. The mobile radio network likewise comprises a Visitor Location Register (VLR) 4. In the drawing, the VLR 4 is assigned to the MSC 100 although it need not be integrated in the same module as the HLR 2. HLR 2, MSC 100, and an updating module 3 are interconnected via a communication network 500. When a mobile radio apparatus 1 leaves the geographical area covered by an MSC 100 and enters the area covered by an other MSC 100 the data record allocated to the mobile radio apparatus 1 is loaded into the VLR 4 allocated to the new MSC. It is thereby possible to transfer the information of a mobile radio apparatus 1 to another MSC and correctly handle outgoing calls. Since the location information in the HLR 2 is likewise updated (roaming), it is possible correctly to route incoming calls as well. For location-based services over a GSM mobile radio network, the location of a mobile radio apparatus 1 in the GSM mobile radio network is determined based upon the individual cells 400 of base stations 300 of the mobile radio network for updating location information of the mobile radio apparatus 1. According to the invention, one or more USSD, SMS, or MMS messages are generated for this purpose by means of an updating module 3, which messages, according to GSM standard, produce an error report upon reception by the mobile radio apparatus 1. Instead of using USSD, SMS, or MMS messages as data messages according to the invention, it is also conceivable to use e.g. IS 136, IS 95 or I-mode etc. if other network standard are used. At least one of the USSD, SMS, or MMS messages thus generated is sent to the mobile radio apparatus 1. The mobile radio apparatus 1 responds with an error report based upon the USSD, SMS, or MMS message received, which report it sends at least to the base station 400-406 of the cell 300-306 in which the mobile radio apparatus 1 is currently situated. By means of that base station which has received the error report from the mobile radio apparatus, the location information of the mobile radio apparatus is updated and stored. For localizing the mobile radio apparatus 1, methods such as triangulation, etc., may also be used.

If USSD messages are used for updating the location, for generating the at least one USSD message which, according to GSM standard, produces an error report upon reception by the mobile radio apparatus 1, the data-coding scheme of the USSD message may be set to false values. The USSD DCS (Data coding Scheme) comprises 1 Octet, where as the USSD String (containing User Data) can be of 1 to 160 Octets. In addition to the DCS octet all other mandatory and optional octets and/or fields can also be transmitted with values set to any combination between 0x00 to 0xFF (HEX). Another possibility is that the mobile radio apparatus 1 sends the error report to the base station 400-406 based upon non-executable USSD data operations. Further possibilities for causing an error report besides those just mentioned are likewise conceivable.

In another embodiment, SMS messages are used to obtain the current cell ID (ID: Identifier). As in the modified embodiments by means of USSD and MMS messages, in this embodiment a location update of the user or a reply to a paging request (via MSC [Mobile Services Switching Center] and/or SGSN [Serving GPRS Node]) is forced by means of a SMS message in the case where the user has changed his COA (Cell Of Arrival), so that the cell ID is updated in the MSC/VLR. SMS represents a means for transmitting short messages between a GSM/UMTS Mobile Station (MS), i.e., a GSM/UMTS mobile radio apparatus, and a SME (Short Message Entity), which may be another MS or a Service Center (SC) for forwarding of SMS, etc. Short Message Services comprises SM MT (Short Message Mobile Termination) and SM MO (Short Message Mobile Originated) as basic services. SM MT denotes the capability of the GSM/UMTS system to transfer a short message submitted from the SC to on MS, and to provide information about the delivery of the short message either by a delivery report or a failure report with a specific mechanism for later delivery (see e.g. ETSI (European Telecommunications Standards Institute) TS (Technical Specification) 123 040 V4.2.0 (2001)). SM MO denotes the capability of the GSM/UMTS system to transfer a short message submitted by the MS to one SME via a SC, and to provide information about the delivery of the short message either by a delivery report or a failure report. The message must include the address of that SME to which the SC shall eventually attempt to relay the short message (see e.g. ETSI TS 123 040 V4.2.0 (2001)). Each text message to be transferred by means of the SM MT or SM MO may contain up to 140 octets. According to the GSM/UMTS specifications, an active MS is able to receive a short message TPDU (SMS-DELIVER) at any time, independently of whether or not there is a speech or data call in progress. SMS-DELIVER is a short message transfer protocol data unit containing user data (the short message), being sent from a SC to a MS. Additionally, a report is always returned to the SC; either confirming that the MS has received the short message, or informing the SC that it was impossible to deliver the short message TPDU to the MS, including the reason why. On the other side, an active MS is also able to submit a short message TPDU (SMS-SUBMIT) at any time, independently of whether or not there is a speech or data call in progress. SMS-SUBMIT is a short message transfer protocol data unit containing user data (the short message), being sent from a MS to a SC. Additionally, a report is always returned to the MS; either confirming that the SC has received the short message, or informing the MS that it was impossible to deliver the short message TPDU to the SC, including the reason why. In this embodiment of the present invention the SMS-protocol is e.g. modified at the Short Message Transfer Layer (SM-TL) and/or the Short Message Relay Layer (SM-RL) in order to achieve the above-mentioned objective. The SM-TL provides a service to the Short Message Application Layer (SM-AL), which enables the SM-AL to transfer short messages to its peer entity, receive short messages from its peer entity and receive reports about earlier requests for short messages to be transferred. In order to keep track of messages and reports about those messages, primitives between the SM-AL and SM-TL contain a Short Message Identifier (SMI), which is a reference number for the message associated with the primitive. This SMI is mapped to and from the SMI used between the SM-TL and the above mentioned Short Message Relay Layer (SM-RL). The SMI is not carried between entities and therefore a given message may have different SMI's at the MS and SC sides. SMS-DELIVER and SMS-SUBMIT are a part of the protocol, by which the SM-TL communicates with its peer entity. The SM-RL on the other sides provides a service to the Short Message Transfer Layer (SM-TL), which enables the SM-TL to send Transfer Protocol Data Units (TPDUs) to its peer entity, receive TPDUs from its peer entity and receive reports about earlier requests for TPDUs to be transferred. In order to keep track of TPDUs and reports about those TPDUs, primitives between the SM-TL and SM-RL contain a Short Message Identifier (SMI), which is a reference number for the TPDU associated with the primitive. This SMI is not carried via the SM-RL protocol. It is carried via the relay layer service between the SC and Gateway MSC for Short Message Service (GMSC). It is also carried between the visited MSC and MS.

In this embodiment the parameter Message Type Indicator (MTI) of the Short Message Protocol Data Unit (SM PDU) in bit 0 and 1 is intentionally set to the following value as indicate in the following table in the Short Message Relay Protocol User Information (SM-RP-UI) field for a Mobile Terminated Short Message:

| bit 1 | bit 0 | Message Type |
|---|---|---|
| 0 | 1 | SMS-SUBMIT |

The values and endocings of the other fileds/parameters of the PDU can be in any combination of the six SM-TL PDU, namely:

| bit 1 | bit 0 | Message Type |
|---|---|---|
| 0 | 0 | SMS-DELIVER (in direction SC to MC) |
| 0 | 0 | SMS-DELIVER REPORT (in direction MC to SC) |
| 1 | 0 | SMS-STATUS-REPORT (in direction SC to MC) |
| 1 | 0 | SMS-COMMAND (in direction MC to SC) |
| 0 | 1 | SMS-SUBMIT (in direction MC to SC) |
| 0 | 1 | SMS-SUBMIT-REPORT (in direction SC to MC) |
| 1 | 1 | Reserved |

Additionally only the first octet containing the MTI defined in the first table MTI Value can be transmitted in the SM-RP-UI field with bit 7 to bit 2 set to any possible combination of values between 00000 to 11111, where  represents bit 1 and bit 0** respectively. In addition to this octet all other mandatory octets and/or fields can also be transmitted with values set to any combination between 0x00 to 0xFF (HEX). The above presented embodiment of the present invention creates a mechanism, which causes the MS to reject the Mobile Terminated Short message operation without the user's needing to and/or being able to take notice of it. The mechanism even does not need a modification of an software and/or hardware component in the already existed parts as e.g. the MS, the MSC, the VLR or the HLR.

In another embodiment, MMS messages are used to obtain the current cell ID (ID: Identifier). A MMS delivery is usually followed by SMS Delivery Notification (WAP Push) Download of the MMS over WAP using GPRS or CSD. This download option can be set to automatic, user confirm, and manual on the terminal, respectively. In general it is possible to say that if a MMS (which comprises a SMS also) is sent, a location update is made in the GSM network. To suppress the alert it is possible e.g. to modify the contents of the SMS notification (WAP Push). Similar type of modifications are possible, too.

It should be pointed out that by means of the method according to the invention the location information of a mobile radio apparatus can be updated without the user of a mobile radio apparatus having to take notice thereof, e.g. in the form of an alert report or an SMS message, etc. The central database for storing the location of the mobile radio apparatus is typically be the home location register/visitor location register 2 of the GSM mobile radio network based upon the GSM standard. However, other similar solutions are also conceivable. In particular, the updating of location information in the HLR/VLR module according to the invention may also be used in the case of problems such as a crash of the HLR as an independent solution or in combination with solutions such as are described in U.S. Pat. No. 5,561,854 (backup and backload). It may be extraordinarily advantageous to update the location information in the mobile radio network periodically, e.g. according to the requirements of a location-based service, at suitable intervals by means of the USSD messages. It is also conceivable that the location-based service can determine the interval for updating the location information of a mobile radio apparatus by means of the USSD/SMS/MMS messages and can indicate this to an updating module 3. The updating of the user's location can thereby be adapted precisely to the momentary requirements of a specific location-based service. Thus, loading of the network with unnecessary data traffic and expenditure of system resources can be minimized. For example, in the case of directions, the resolution of location for user guidance should normally be the greatest at the beginning and end of the service, whereas in the middle (e.g. when the user is on the motorway between Paris and Basel), a rougher resolution of location is quite sufficient. However, there are also a large number of other examples, such as advertising displays. In locations (city center, etc.) having a high density of shops, the refinement of location for the mobile radio apparatus 1 should be better than in uncrowded areas having a low density of shops and sales outlets in order to provide the user of the mobile radio apparatus 1 with the right amount of advertising. In such a solution, it is likewise conceivable that based on the change of location in the HLR/VLR data record of a mobile radio apparatus 1, the geographical speed of movement may be calculated or estimated by means of an updating unit 3, and the updating interval by means of USSD/SMS/MMS messages may then be adapted based upon the momentary local speed of movement of the mobile radio apparatus. A predefined refinement of location for mobile radio apparatuses 1 in the HLR 2 could thereby likewise be guaranteed to service providers.

Figure 2:
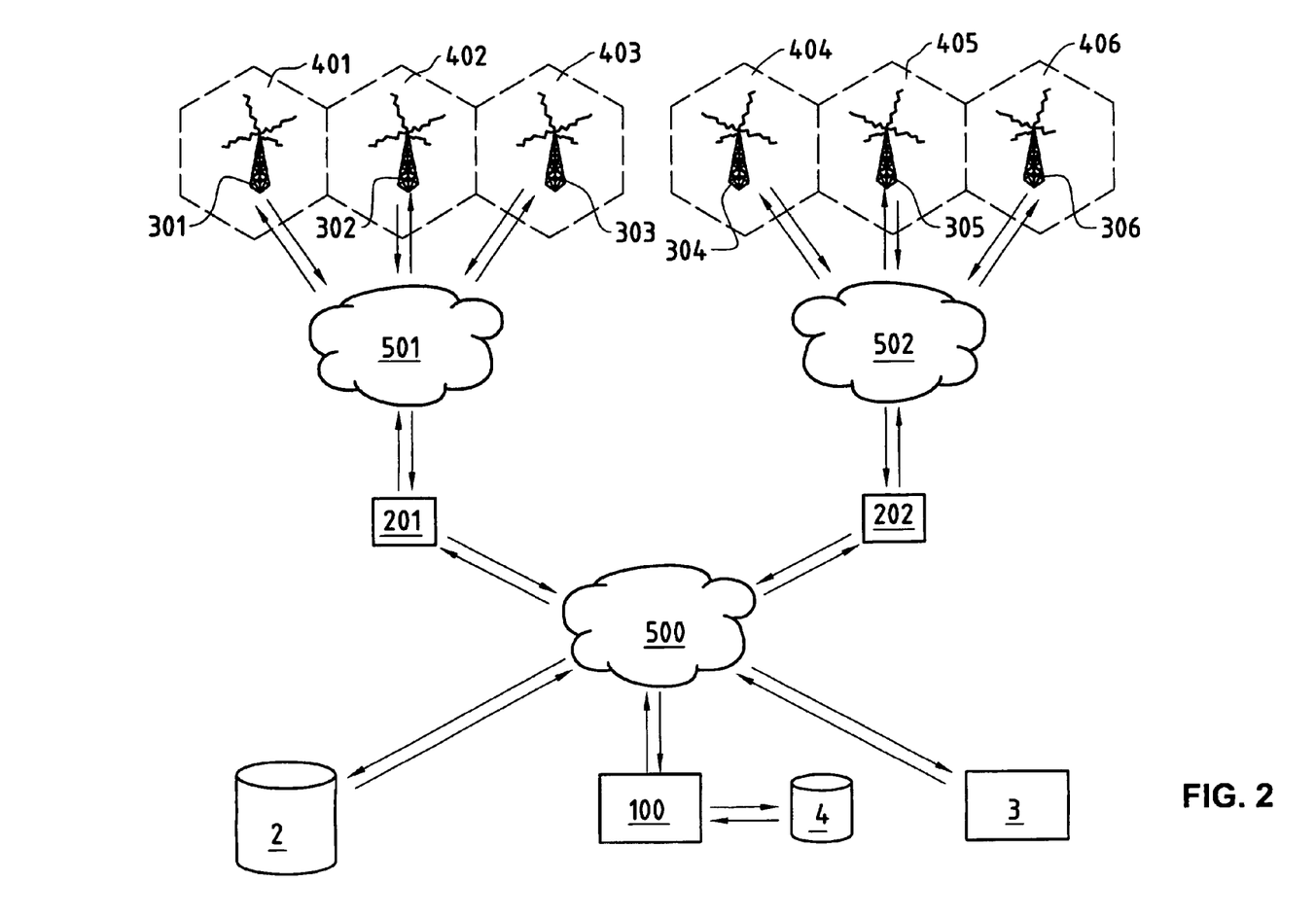
FIG. 2 shows, like FIG. 1, a block diagram which illustrates schematically the architecture of an embodiment of a GSM mobile radio network with home location register 2 according to the invention, FIG. 2 showing several cells 401-406 having several BSC 201-202, the MSC 100, and the HLR 2 of the network.

FIG. 2 illustrates an architecture which may be used for carrying out the invention. In this exemplary embodiment, a mobile radio network comprises at least one mobile-services switching center MSC 100 having a transmission-reception area allocated to the mobile-services switching center 100 and one or more base station controllers 201-202, each having one or more base stations (BTS: Base Transceiver Station) 301-306. The installation of the mobile radio network and its components may, for example, take place according to the GSM standard (Global System for Mobile Communications) of the ETSI standard (European Telecommunications Standards Institute) or to the UMTS standard (Universal Mobile Telephone System). The mobile radio network may, for example, be a public mobile radio network (PLMN: Public Land Mobile Network) and/or GGSN to an IP-Network. The mobile radio network is, for example, connected via the mobile-services switching center MSC 100 to the public, switched telephone network (PSTN: Public Switched Telephone Network). The mobile-services switching center 100 comprises switching and signaling functions for managing mobile radio apparatuses. The base station controllers 201-202 are connected to the MSC 100 by means of a communication network and comprise checking and control functions for the base stations 301-306. Each of one or more of the base stations 301-306 is connected to a jointly allocated base station controller 201-202 and each comprises means of exchanging RF signals with mobile radio apparatuses which are situated within the transmitting-receiving region covered by a base station 301-306, a so-called transmitter-receiver cell 401-406. As in FIG. 1, reference numeral 3 indicates an updating module for generating and sending the USSD messages. The BSC 201-202 and the base stations 301-306 are interconnected via the communication networks 201 and 202, whereas the BSC 201-202, the HLR 2, the MSC 100 and the updating module are likewise connected by means of communication networks 500. The rest of the description coincides with the remarks on FIG. 1.

Figure 3:
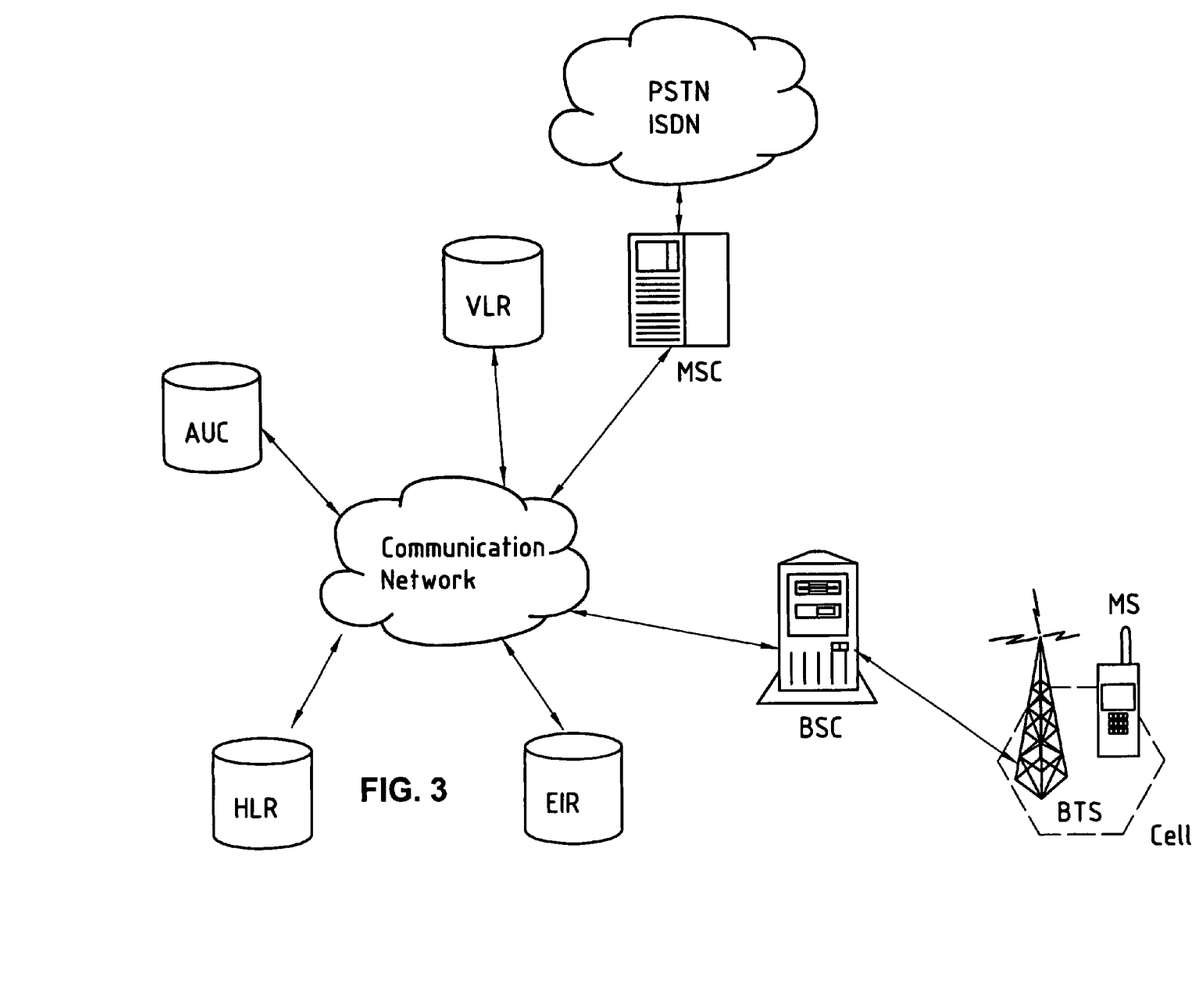
FIG. 3 shows a block diagram which illustrates schematically the architecture of an embodiment of a GSM mobile radio network with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS.
Figure 4:
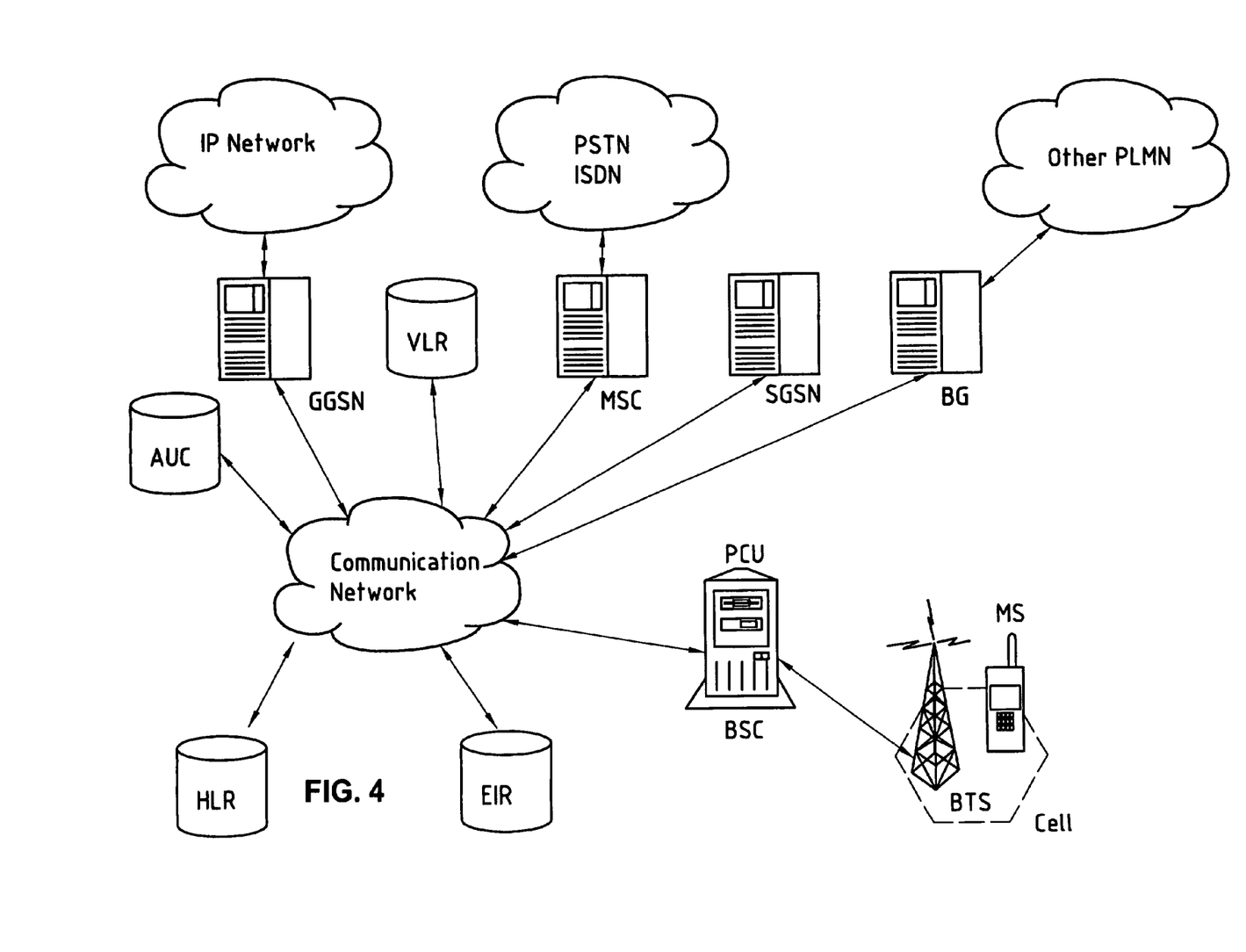
FIG. 4 shows a block diagram which illustrates schematically the architecture of an embodiment of a GSM mobile radio network in addition with GPRS (Generalized Packet Radio Service) with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS.
Figure 5:
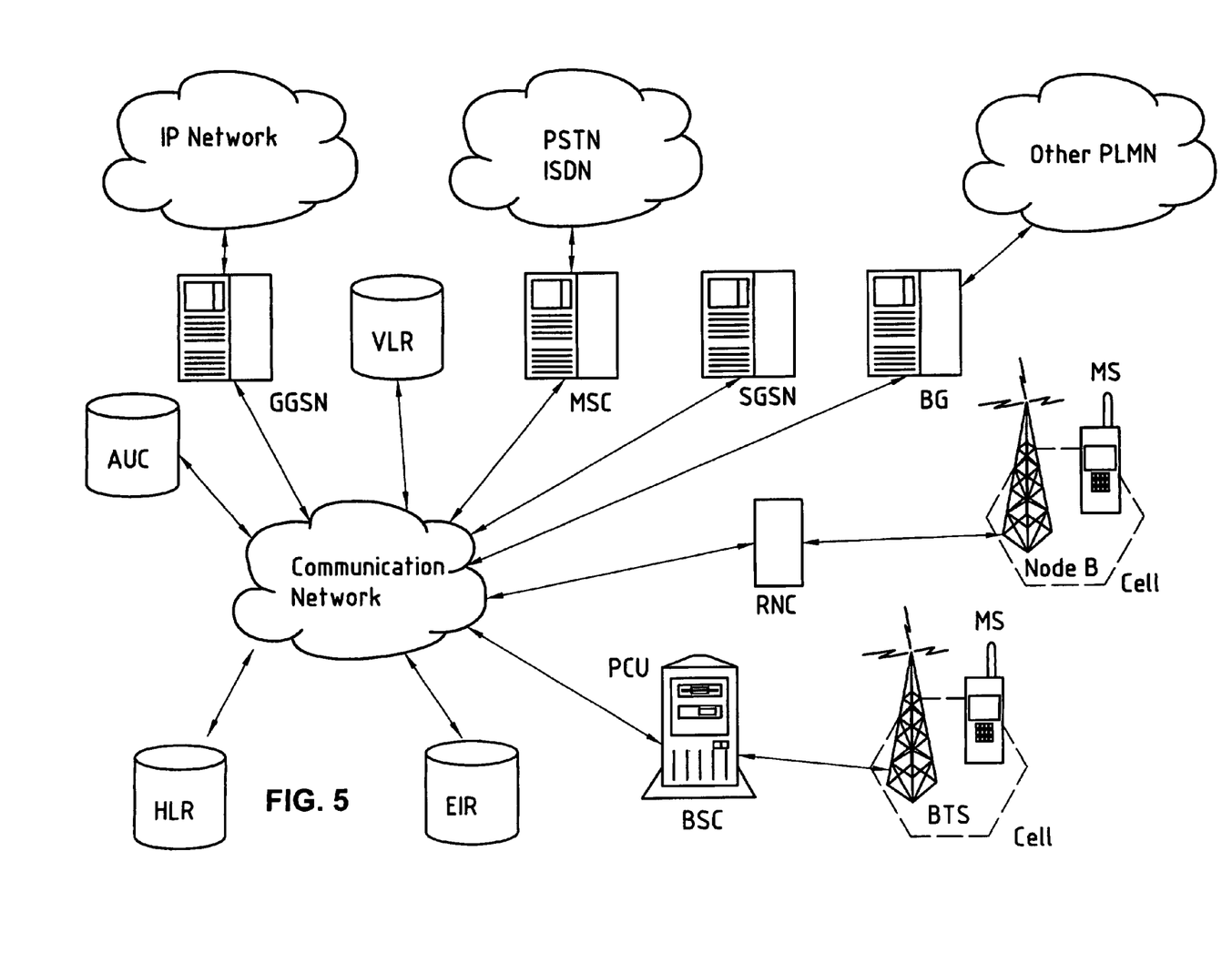
FIG. 5 shows a block diagram which illustrates schematically the architecture of an embodiment of a GSM mobile radio network in addition with UMTS (Universal Mobile Telephone System) and GPRS (Generalized Packet Radio Service) with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS.

It has to be mentioned that the location update procedure varies according to the GSM, GPRS, and UMTS standards, respectively. FIGS. 3, 4 and 5 illustrate the different architecture and the data flow of the location update. FIG. 3 shows a block diagram which illustrates schematically the architecture of an embodiment of a GSM mobile radio network with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS. FIG. 4 shows a block diagram which illustrates schematically the architecture of an embodiment of a GSM mobile radio network in addition with GPRS (Generalized Packet Radio Service) with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS. FIG. 5 shows a block diagram which illustrates schematically the architecture of an embodiment of a GSM mobile radio network in addition with UMTS (Universal Mobile Telephone System) and GPRS (Generalized Packet Radio Service) with home location register HLR and/or visitor location register VLR according to the invention more detailed, in which the location information of the mobile radio apparatus MS is updated and stored in the home location register HLR and/or the visitor location register VLR by means of USSD, SMS, or MMS messages which, according to GSM standard, produce an error report upon reception by the mobile radio apparatus MS. The labels of the FIGS. 3, 4, and 5 are used according to the GSM/GPRS/UMTS standards, as e.g. GGSN for Gateway GPRS Support Node, SGSN for Serving GPRS Support Node, MS for Mobile Station, HLR for Home Location Register and VLR for Visitor Location Register etc.

The invention claimed is:

1. A method for location-based services over a mobile radio network, a location of a mobile radio apparatus in the mobile radio network being determined based upon individual cells of base stations of the mobile radio network for updating location information of the mobile radio apparatus, said method comprising:
   sending, to the mobile apparatus, at least one or more data messages generated according to a telecommunication standard;
   generating, by the mobile radio apparatus, an error report upon (i) reception of the at least one or more generated data messages and (ii) a determination from the at least one or more data messages that, according to the telecommunications standard, the error report has to be produced;
   sending the error report, generated based upon the telecommunication standard of the received data messages, to at least a base station and/or a node of a cell in which the mobile radio apparatus is currently located or attached; and
   updating and storing the location information of the mobile radio apparatus.

2. The method according to claim 1, wherein a Global System for Mobile communications (GSM) and/or a General Packet Radio Service (GPRS) and/or a Universal Mobile Telecommunication System (UMTS) mobile radio network is used for the mobile radio network.

3. The method according to claim 2, wherein the one or more data messages are Short Message Service (SMS) messages, which are generated according to a GSM/GPRS/UMTS standard,
   the mobile radio apparatus generates the error report upon
      (i) reception of at least one or more SMS messages and
      (ii) a determination from the at least one or more SMS messages that, according to the GSM/GPRS/UMTS standard, the error report has to be produced,
   the mobile radio apparatus sends the error report, generated based upon the GSM/GPRS/UMTS standard of the received at least one or more SMS messages to at least the base station of the cell in which the mobile radio apparatus is currently located, and
   the location information of the mobile radio apparatus is updated and stored.

4. The method according to claim 2, wherein the one or more data messages are Unstructured Supplementary Service Data (USSD messages), which are generated according to a GSM/GPRS/UMTS standard,
   the mobile radio apparatus generates the error report upon
      (i) reception of at least one or more USSD messages and
      (ii) a determination from the at least one or more USSD messages that, according to the GSM/GPRS/UMTS standard, the error report has to be produced,
   the mobile radio apparatus sends the error report, generated based upon the GSM/GPRS/UMTS standard of the received at least one or more USSD messages to at least the base station of the cell in which the mobile radio apparatus is currently located, and
   the location information of the mobile radio apparatus is updated and stored.

5. The method according to claim 2, wherein the one or more data messages are Multimedia Messaging Service (MMS) messages, which are generated according to a GSM/GPRS/UMTS standard,
   the mobile radio apparatus generates the error report upon
      (i) reception of at least one or more MMS messages and
      (ii) a determination from the at least one or more MMS messages that, according to the GSM/GPRS/UMTS standard, the error report has to be produced,
   the mobile radio apparatus sends an error report based upon the GSM/GPRS/UMTS standard of the received at least one or more MMS messages to at least the base station of the cell in which the mobile radio apparatus is currently located, and
   the location information of the mobile radio apparatus is updated and stored.

6. The method according to one of the claims 1 to 5, wherein the location information of the mobile radio apparatus is updated and stored in a home location register and/or a visitor location register module of the mobile radio network.

7. The method according to claim 1, wherein a data-coding scheme of the one or more data messages, generated in accordance with the telecommunication standard, is set to false values.

8. The method according to claim 1, wherein the mobile radio apparatus sends the error report to the base station based upon non-executable data operations.

9. The method according to claim 1, wherein the location information in the mobile radio network is updated periodically at suitable intervals by means of the one or more data messages.

10. The method according to claim 1, wherein a location-based service determines an interval for updating the location information of a mobile radio apparatus by means of the one or more data messages.

11. The method according to claim 1, wherein an interval for updating the location information of a mobile radio apparatus by means of the data messages is adapted based upon a momentary local speed of movement of the mobile radio apparatus.

12. A mobile radio network comprising:
a mobile-services switching center;
one or more base station controllers, each controller having one or more base stations, which mobile radio network is connected via the mobile-services switching center to a public switched telephone network;
a home location register module configured to store location information of a mobile radio apparatus in the mobile radio network, which location information includes at least location information based upon one or more cells of the one or more base stations;
an updating unit configured to generate one or more data messages including data codes according to a Global System Mobile communications (GSM) standard, at least one thus generated data message being sent to the mobile radio apparatus whose location is to be determined;
the mobile radio apparatus configured to generate an error report upon (i) reception of the at least one generated data message and (ii) a determination from the at least one generated data message that, according to the GSM standard, the error report has to be produced, and send the error report to at least a base station of a cell in which the mobile radio apparatus is currently located, the location information being updated according to the error report and stored in the home location register and/or a visitor location register module.

13. The mobile radio network according to claim 12, further comprising:
a GSM and/or a Universal Mobile Telecommunication System (UMTS) and/or a General Packet Radio Service (GPRS) mobile radio network.

14. The mobile radio network according to claim 13, wherein the one or more data messages are Short Message Service (SMS) messages including the data codes generated according to a GSM/GPRS/UMTS standard,
the mobile radio apparatus is configured to generate the error report upon (i) reception of at least one or more SMS messages and (ii) a determination from the at least one or more SMS messages that, according to the GSM/GPRS/UMTS standard, the error report has to be produced,
the mobile radio apparatus is configured to send the error report, generated based on the GSM/GPRS/UMTS standard of the received at least one or more SMS messages to at least the base station of the cell in which the mobile radio apparatus is currently located, and
the location information is updated according to the error report and stored in the home location register and/or visitor location register module.

15. The mobile radio network according to claim 13, wherein the one or more data messages are Unstructured Supplementary Service Data (USSD) messages including data codes generated according to a GSM/GPRS/UMTS standard,
the mobile radio apparatus is configured to generate the error report upon (i) reception of at least one or more USSD messages and (ii) a determination from the at least one or more USSD messages that, according to the GSM/GPRS/UMTS standard, the error report has to be produced,
the mobile radio apparatus is configured to send the error report, generated based on the GSM/GPRS/UMTS standard of the received at least one or more USSD messages to at least the base station of the cell in which the mobile radio apparatus is currently located, and
the location information is updated according to the error report—and stored in the home location register and/or visitor location register module.

16. The mobile radio network according to claim 13, wherein the data messages are Multimedia Messaging Service (MMS) messages including data codes generated according to a GSM/GPRS/UMTS standard,
the mobile radio apparatus is configured to generate the error report upon (i) reception of at least one or more USSD messages and (ii) a determination from the at least one or more USSD messages that, according to the GSM/GPRS/UMTS standard, the error report has to be produced,
the mobile radio apparatus is configured to send the error report, generated based on the GSM/GPRS/UMTS standard of the received at least one or more USSD messages to at least the base station of the cell in which the mobile radio apparatus is currently located, and
the location information is updated according to the error report—and stored in the home location register and/or visitor location register module.

17. The mobile radio network according to claim 12, wherein the one or more data messages includes false values in the data-coding scheme.

18. The mobile radio network according to claim 12, wherein the one or more data messages includes non-executable data operations.

19. The mobile radio network according to claim 12, wherein a location-based service includes variable requirements, based upon which the location information in the mobile radio network is periodically updated at suitable intervals by means of the data messages.

20. The mobile radio network according to claim 12, wherein an interval for updating the location information of a mobile radio apparatus by means of the one or more data messages is determinable by a location-based service.

21. The mobile radio network according to claim 12, wherein an interval for updating the location information of a mobile radio apparatus by means of the one or more data messages is variable based upon the momentary local speed of movement.

22. The method according to claim 1, wherein the one or more data messages are generated using a format independent of a communication hardware on the mobile radio apparatus.

23. The mobile radio network according to claim 12, wherein the one or more data messages are generated using a format independent of a communication hardware on the mobile radio apparatus.

* * * * *

UNITED STATES PATENT AND TRADEMARK OFFICE
CERTIFICATE OF CORRECTION

PATENT NO. : 7,496,370 B2  Page 1 of 1
APPLICATION NO. : 10/486204
DATED : February 24, 2009
INVENTOR(S) : Asesh Bhaumick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1334 days.

Signed and Sealed this

Seventh Day of September, 2010

David J. Kappos
*Director of the United States Patent and Trademark Office*